May 22, 1962  F. A. REIFENHÄUSER  3,035,304
APPARATUS FOR WORKING OF THERMOPLASTIC
SYNTHETIC PLASTICS IN SCREW PRESSES
Filed Oct. 31, 1960

INVENTOR
FRIEDRICH ALOYSIUS REIFENHÄUSER
BY
Williams, Tilbery & Golrick
ATT'YS

United States Patent Office 3,035,304
Patented May 22, 1962

3,035,304
APPARATUS FOR WORKING OF THERMOPLASTIC SYNTHETIC PLASTICS IN SCREW PRESSES
Friedrich Aloysius Reifenhäuser, Troisdorf, Germany, assignor to Reifenhauser K. G., Troisdorf, Germany
Filed Oct. 31, 1960, Ser. No. 66,071
Claims priority, application Germany Nov. 27, 1959
3 Claims. (Cl. 18—12)

The present invention relates to an apparatus for working of thermoplastic synthetic plastic materials in screw presses having two or more screws coaxially disposed to one another.

For the working of plasticizable substances with screw presses, there has already been proposed the combination of two conveying screws for simultaneously conveying different masses to the discharge head of the press. In such case there can either be provided a single screw body which bears an inner and an outer screw thread and is disposed in a cylindrical jacket, or there may be present in one cylindrical jacket two coaxial screw spindles running into one another which each bear an external screw thread. These known combinations are advantageously used for the working of different types or differently colored plastic substances.

But since with these known arrangements of coaxially disposed screws, where one is rotatable in the other, the disadvantage arises that the materials enter between and flow backward between the inner wall of the outer screw and the outer surface of that part the other screw disposed therein, the proposal has also been made for obviating this difficulty that the outer press screw have also an inner screw thread which, in the region of the charging device for the external screw, likewise is put in communication with the charging device through apertures in the body of the external press screw; so that these inner screw threads, just as the external screw threads on the same screw body, fulfill the function of advancing or conveying the working material to the discharge head.

In contrast to the known arrangements, in the case of the present invention the function is proposed of degassing the material, and if necessary, also of freeing the same from moisture, before entrance into the discharge head but after completion of the plasticizing, by the use of at least two coaxial screw spindles, one of which is running toward the other. For the attainment of this function a manner of operation is proposed, in which screws working behind one another in the same main jacket cylinder are driven with relatively different rotational speeds, in such manner that the second screw (serving primarily for conveying material to the discharge head) advances the synthetic plastic mass which has already been rendered homogeneous and plasticized by the first screw, faster than the first screw delivers the same; so that in the boundary region between the screw threads of the coaxial successively ordered screws there occurs a pressure reduction effective for degassing and drying of the material. This lowered pressure can be varied at will be varying the difference in the relative rotational spindle speeds. Further, a plurality of such expansion spaces may be provided in one cylinder between pairs of successive screws.

An apparatus adapted for carrying out the process is attained by providing within the press main cylinder an annular expansion space between the threads of the two screws which corresponds in size to the thread height of the screw spindles, in the region of which space apertures are provided in the cylinder for drawing off the liberated fluids. Further in accordance with the invention, for increasing the pressure to which the material is subjected before entering the expansion space, this apparatus can be still further improved by having the outer screw formed as an externally threaded hollow cylinder and supporting therein the core or shank of the inner screw spindle in a known arrangement; at the end of the first screw thread separating the annular cross section, corresponding to the thread height of the first screw spindle, from an expansion space lying within the screw cylinder by means of a partition wall provided with narrow apertures or flow-resisting passages; and locating in this expansion space the start of threads on the second screw, which is disposed in the same common cylinder and serves for advance or conveying of the material to the discharge head. In this region then there would also be disposed the apertures or vents in the cylinder for drawing off gas.

This partition wall, pierced by passages or perforations according to the invention, is formed by a conical or bevel formation on the hollow cylindrical core of the external or first screw which expands out to the diameter of the external cylindrical jacket; so that this partition wall therefore comprises a part of the external screw-spindle or its core, which at its forward edge has a close running fit on the cylinder wall. By this means there is attained an essential simplification in the fabrication and also a greater certainty in operation of the apparatus, inasmuch as there is avoided the incorporation of a dam disk, as it has hitherto been provided in the case of known screw press arrangements.

In the described expansion space then, the released and degassing plastic material is engaged by the screw threads of the succeeding inner screw. The screw threads are adapted in diameter at their starting end to the conical or beveled end form of the hollow cylindrical spindle of the outer or first screw, and moreover may be reduced in diameter to extend by a few threads into the interior space of the hollow cylinder in which the core or shank of the inner screw is supported. By this means there is attained a sufficient seal against the penetration of the plastic material between the shank of the inner screw and the hollow cylindrical core of the outer screw.

According to the invention the inner conveying thread can be applied to the inner screw or the inner conveying thread can be machined in the internal jacket of the outer screw, for in both cases through the relative motion there is attained the same operation of advancing the material in the direction toward the discharge head.

Of course in the elaboration of the inventive concept, the inner conveying threads can be extended or carried out over the entire length of the core of the inner screw or over the entire length of the inner cylindrical jacket of the outer screw, in which case advantageously there are provided in the hollow cylindrical body of the outer screw perforations or apertures through which also the thread of the inner screw is put in communication with a single common charging or supply funnel.

For carrying off of gas, apertures are provided in the main cylindrical jacket of the press in the expansion region between the threads of the outer and the threads of the inner screw.

Figure 1:
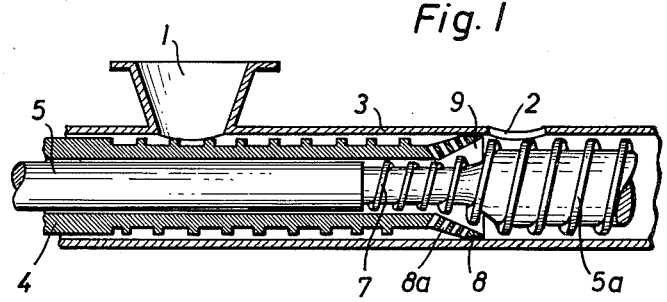
FIG. 1 is a vertical longitudinal section through the pertinent parts of the screw press embodying the present invention.

FIG. 1 is a vertical longitudinal section through the pertinent parts of a screw press embodying one form of this invention. In the usual main jacket cylinder 3 of the press are coaxially disposed the outer and inner screw spindles 4 and 5. On spindle 5 the threads 5a are reduced and carried onto the shank of 5 to extend into the hollow cylinder of the outer screw 4 as threads 7, which advance material in the same sense as the threads on the screw 4 so that no material can flow rearwardly. The hollow cylindrical core of the external screw 4 at its forward end, that is the end towards the discharge head, is enlarged in a funnel-like shape, so that a partition is provided between the conveying space of the first screw and that of the succeeding inner screw. This funnel-like enlargement 8 is provided with passages 8a through which the material plasticized and advanced by the threads of screw 4 is expressed under a back pressure to arrive in the expansion space 9. In this expansion space there occurs a marked pressure relief and in consequence thereof a degassing of the mass. Such gas can be sucked off through an opening 2 into the downstream cylindrical space. The degassed material is then further transported to the injection head by the screw threads 5a of the inner screw 5, the diameter of which corresponds to that of the screw threads of the screw 4. The screw 5 can be driven at a higher rotational rate than the screw 4 and thereby can be obtained an adjustable or selectable lowered pressure on the transfer from the screw 4 to the screw 5.

Figure 2:
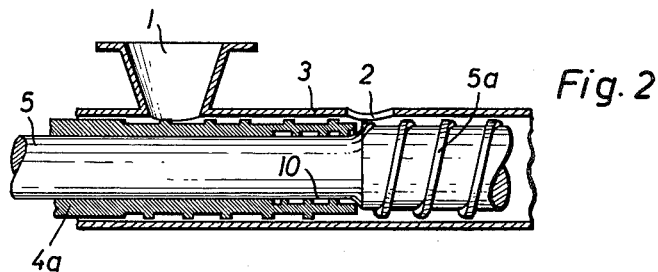
FIG. 2 is a view similar to FIG. 1 for a modification.

The modification shown in FIG. 2, in principle is the same as that in FIG. 1 with the difference that the inner screw thread 10 is cut into the inner wall of the hollow cylindrical core of the outer screw 4a so that therefore the core of the inner screw 5 in the conveying region of the screw 4a is smooth. With this arrangement for the purpose of mixing the screws can be operated in counter rotational sense. Also it is here possible to use the screw 5a as a piston as in the case of some injection presses.

Figure 3:
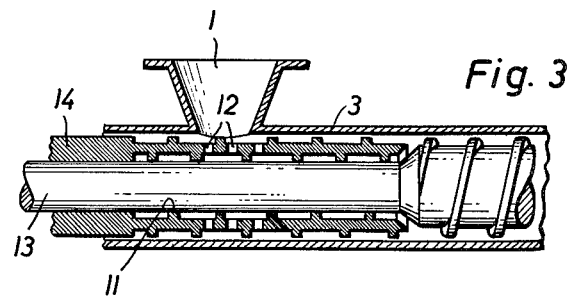
FIG. 3 is a similar view for a further modification.

A further modification of the arrangement disclosed in FIG. 1 is shown in FIG. 3 where the screw threads 11 cut into the inner wall surface of the hollow core of the outer screw extend over the entire effective length of the external screw spindle. Further in the case of this modification, the interior screw thread is put in direct communication with the supply funnel 1 through openings 12 in the hollow screw cylinder wall, and these threads 11 operate to advance material in the same sense as the external screw thread of the same screw member 14. The material from the supply funnel 1 flows into the outer and interior screw threads and is, after consequent plasticizing without gas liberation, engaged by the screw thread of the second screw and advanced further. In this case the screws 13 and 14 advantageously or purposely have opposite directions of rotation. This apparatus is advantageous for working of synthetic plastics with low bulk weight.

It should be noted that the coaxially disposed spindles, with screw threads in longitudinal succession in a main press cylinder, may be arranged not only in a main cylinder of uniform diameter, but also the cylinder may have portions which are of different diameters corresponding to respectively different diameters of the screws, and that either one of a pair of successive screws may be the larger. Further, more than two successive screws may be used in one cylinder; and a plurality of any such arrangements as hitherto discussed may be organized with jacket cylinders in series, or next to each other in parallel.

What is claimed is:

1. For the working of synthetic thermoplastic materials, a screw press with a plurality of screws for kneading and conveying material comprising: at least two coaxial screws longitudinally aligned in a common press cylinder, one of said screws including an externally threaded hollow cylindrical portion adapted to serve as a material homogenizing and plasticizing kneading screw, an immediately succeeding second screw having a shank rotatably supported in the said one screw and serving to propel toward a discharge end of the press material discharged by said one screw, and a partition wall provided by a hollow conical enlargement on an end of said hollow cylindrical portion flaring out forwardly from the end of the thread thereon toward the discharge end of the press substantially to the inside diameter of the press cylinder, said wall being multiply perforated by small apertures and said wall with said press cylinder and an adjacent reduced portion of the second screw defining an annular expansion space separated from the material working space about the said one screw, a material propelling thread of the second screw starting in said expansion space, said screws being adapted to be driven at relatively different rotational rates and the said second screw to advance the material faster than the first screw, whereby, in the expansion space, there occurs a reduction in pressure operating to degass and dry the material being worked in the press, said cylinder being apertured in the region of said expansio space for drawing off liberated gas.

2. A screw press as described in claim 1, wherein the propelling threads of said second screw are reduced and carried part way into the interior space of the hollow cylinder of said one screw.

3. A screw press as described in claim 1, wherein a plurality of such expansion-spaces is provided within the press cylinder.

References Cited in the file of this patent

UNITED STATES PATENTS

| 1,156,096 | Price | Oct. 12, 1915 |
| 2,078,565 | Durst et al. | Apr. 27, 1937 |
| 2,764,780 | Reifenhauser | Oct. 2, 1956 |
| 2,836,851 | Holt | June 3, 1958 |
| 2,902,923 | Stacy | Sept. 8, 1959 |